United States Patent
Pai

(10) Patent No.: US 9,730,005 B2
(45) Date of Patent: *Aug. 8, 2017

(54) CONTAINER-LOCATED INFORMATION TRANSFER MODULE

(71) Applicant: Freescale Semiconductor, Inc., Austin, TX (US)

(72) Inventor: Prasan Pai, Mission Viejo, CA (US)

(73) Assignee: NXP USA, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/879,765

(22) Filed: Oct. 9, 2015

(65) Prior Publication Data

US 2016/0037288 A1 Feb. 4, 2016

Related U.S. Application Data

(63) Continuation of application No. 13/594,489, filed on Aug. 24, 2012, now Pat. No. 9,185,501.

(60) Provisional application No. 61/662,217, filed on Jun. 20, 2012.

(51) Int. Cl.
| | |
|---|---|
| *H04B 5/00* | (2006.01) |
| *H04W 4/00* | (2009.01) |
| *H04R 25/00* | (2006.01) |
| *A61J 1/00* | (2006.01) |

(52) U.S. Cl.
CPC ............... *H04W 4/008* (2013.01); *A61J 1/00* (2013.01); *H04R 25/554* (2013.01); *H04R 2225/43* (2013.01); *H04R 2225/55* (2013.01); *H04R 2460/03* (2013.01); *H04R 2460/13* (2013.01)

(58) Field of Classification Search
CPC ...... H04B 5/0062; H04B 5/02; H04B 1/3883; H04B 1/3805; H04B 1/3816; H04B 5/0025; H04B 5/0031; H04B 5/0037; H04B 5/0056; H04B 7/0604; H04W 4/008; H04W 4/02; H04W 4/20; H04W 12/06; H04W 48/02; H04W 4/001; H04W 4/003; H04W 4/023; H04W 4/026; H04W 4/028; H04W 4/12; H04W 4/206; H04W 64/00; H04W 80/00; H04W 84/10; H04W 8/005

See application file for complete search history.

(56) References Cited

U.S. PATENT DOCUMENTS

| | | | |
|---|---|---|---|
| 5,721,783 | A | 2/1998 | Anderson |
| 6,839,446 | B2 | 1/2005 | Blumenau |
| 7,072,480 | B2 | 7/2006 | Rass |
| 7,224,815 | B2 | 5/2007 | Maltan et al. |
| 8,094,848 | B1 | 1/2012 | Frerking et al. |
| 9,185,501 | B2 | 11/2015 | Pai |
| 2006/0214789 | A1* | 9/2006 | Posamentier ...... G06K 19/0716 340/545.6 |
| 2007/0164858 | A1 | 7/2007 | Webb |

(Continued)

FOREIGN PATENT DOCUMENTS

WO 2011/091856 A1 8/2011

*Primary Examiner* — Golam Sorowar

(57) ABSTRACT

Techniques are described herein that transfer information using a container-located module. The module is coupled to sensor(s) that are configured to detect characteristic(s) pertaining to a medical substance that is included in a medical container. The module wirelessly transfers information that is based on the characteristic(s) to a requesting device in response to a request from the requesting device.

18 Claims, 5 Drawing Sheets

(56) References Cited

U.S. PATENT DOCUMENTS

| | | | |
|---|---|---|---|
| 2008/0061945 A1* | 3/2008 | Hoshina | H04B 5/02 340/10.51 |
| 2008/0205659 A1 | 8/2008 | Fischer et al. | |
| 2008/0267416 A1 | 10/2008 | Goldstein et al. | |
| 2009/0076804 A1 | 3/2009 | Bradford et al. | |
| 2010/0012653 A1* | 1/2010 | Ulrich | B65D 79/02 220/1.5 |
| 2010/0040248 A1 | 2/2010 | Shridhar et al. | |
| 2010/0045425 A1* | 2/2010 | Chivallier | A61B 5/0002 340/5.8 |
| 2010/0047928 A1* | 2/2010 | Hatakeyama | G01N 33/54386 436/518 |
| 2010/0090809 A1 | 4/2010 | Yeo et al. | |
| 2010/0101317 A1* | 4/2010 | Ashrafzadeh | G01F 23/0061 73/149 |
| 2010/0102959 A1* | 4/2010 | Ashrafzadeh | G06Q 10/087 340/540 |
| 2010/0150348 A1 | 6/2010 | Fairbanks et al. | |
| 2010/0171586 A1* | 7/2010 | Park | G06K 19/0717 340/5.1 |
| 2010/0296668 A1 | 11/2010 | Lee et al. | |
| 2011/0043364 A1* | 2/2011 | Stefanelli | A45D 34/00 340/572.8 |
| 2011/0098112 A1 | 4/2011 | LeBoeuf et al. | |
| 2012/0267442 A1* | 10/2012 | Choi | G05D 23/1902 236/51 |
| 2013/0043735 A1 | 2/2013 | Low et al. | |
| 2013/0142367 A1 | 6/2013 | Berry et al. | |
| 2013/0343584 A1 | 12/2013 | Bennett et al. | |
| 2013/0344806 A1 | 12/2013 | Pai | |

* cited by examiner

CONTAINER-LOCATED INFORMATION TRANSFER MODULE

CROSS-REFERENCE TO RELATED APPLICATIONS

This application is a continuation of U.S. patent application Ser. No. 13/594,489, filed Aug. 24, 2012, now allowed, which claims the benefit of U.S. Provisional Application No. 61/662,217, filed Jun. 20, 2012, both of which are incorporated by reference herein in their entireties.

BACKGROUND

Medical substances often are stored and/or transported using medical containers, such as Petri dishes, test tubes, fluid bags, syringes, etc. A medical substance is a substance (e.g., gas, liquid, solid, etc.) that is taken from an organism (e.g., a human body) and/or a substance that is to be introduced into and/or onto an organism for a purpose that pertains to health of the organism (e.g., for prevention, diagnosis, and/or treatment of a medical condition with regard to the organism). Medical substances that may be taken from an organism include but are not limited to blood, feces, urine, bile, bone marrow, muscle tissue, skin, brain tissue, cartilage, ligament, bone, etc. Medical substances that may be introduced (e.g., injected, ingested, inhaled, inserted, etc.) into and/or onto an organism include but are not limited to medicine, blood, bone marrow, tissue, cartilage, ligament, bone, nutritional supplement, etc. Medical substances that are introduced into an organism may be introduced, for example, via a vein, tissue, joint, bony structure (e.g., spine), organ, digestive system, etc. of the organism.

BRIEF SUMMARY

A system and/or method for transferring information using a container-located module, substantially as shown in and/or described in connection with at least one of the figures, as set forth more completely in the claims.

BRIEF DESCRIPTION OF THE DRAWINGS/FIGURES

The accompanying drawings, which are incorporated herein and form part of the specification, illustrate embodiments of the disclosed technologies and, together with the description, further serve to explain the principles involved and to enable a person skilled in the relevant art(s) to make and use the disclosed technologies.

Figure 1:
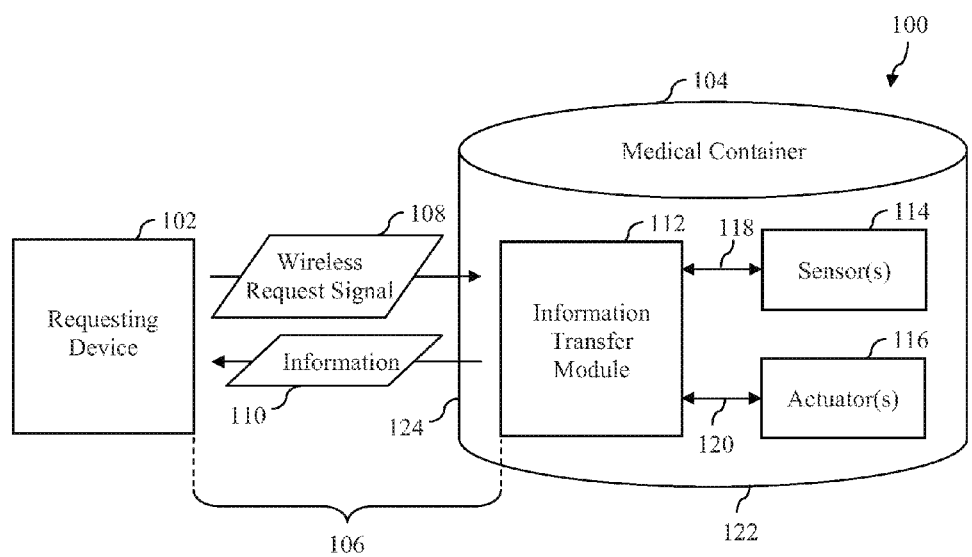
FIG. 1 is a block diagram of an example information transfer system in accordance with an embodiment described herein.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate example embodiments of the disclosed technologies. However, the scope of the disclosed technologies is not limited to these embodiments, but is instead defined by the appended claims. Thus, embodiments beyond those shown in the accompanying drawings, such as modified versions of the illustrated embodiments, may nevertheless be encompassed by the disclosed technologies.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Various approaches are described herein for, among other things, transferring information using a container-located module. The module is coupled to sensor(s) that are configured to detect characteristic(s) pertaining to a medical substance that is included in a medical container. The module wirelessly transfers information that is based on the characteristic(s) to a requesting device when the requesting device requests the information. For example, the requesting device (e.g., a mobile device, such as a personal digital assistant (PDA), a cellular telephone, etc.) may be tapped against the medical container to cause the information to be transferred from the module to the requesting device. In accordance with this example, tapping the requesting device against the medical container may initiate the request.

An example system is described that includes a medical container, sensor(s), and an information transfer module. The medical container has an interior surface that defines an interior volume configured to contain a medical substance. The sensor(s) are configured to detect characteristic(s) pertaining to the medical substance. The information transfer module is coupled to the sensor(s). The information transfer module is configured to wirelessly transfer information, which is based on at least one of the characteristic(s), to a requesting device that is external to the medical container in response to the requesting device coming within a designated proximity of the information transfer module.

Another example system is described. The system includes a medical container, sensor(s), and a near field communication (NFC) device. The medical container has an interior surface that defines an interior volume configured to contain a medical substance. The sensor(s) are configured to detect characteristic(s) pertaining to the medical substance. The NFC device is coupled to the sensor(s). The NFC device is configured to wirelessly transfer information, which is based on at least one of the characteristic(s), to a near field reader in accordance with a near field communication protocol in response to receipt of a wireless signal from the near field reader.

An example method is also disclosed. In accordance with the method, a wireless signal that requests information is received at an information transfer module, which is associated with a medical container, from a requesting device that is external to the medical container. Characteristic(s) that pertain to a medical substance that is included in an interior volume of the medical container, which is defined by an interior surface of the medical container, are detected using sensor(s) that are coupled to the information transfer module. The information, which is based on the characteristic(s), is wirelessly transferred to the requesting device in response to detecting the characteristic(s).

The information transfer techniques described herein have a variety of benefits as compared to conventional techniques. For instance, the techniques described herein may reduce an amount of time that is consumed by obtaining information pertaining to a medical substance. The techniques may provide such information without a need to remove any portion of the medical substance from the medical container (e.g., without providing physical access to the medical substance). The techniques may be capable of performing tests and/or analyses with regard to the medical substance while the medical substance is in the medical container (e.g., while the medical substance is sealed within the medical container). The techniques may improve security of information pertaining to medical substances by utilizing information transfer protocols that are characterized by relatively short transmission ranges (e.g., a near field communication (NFC) protocol).

II. Example Information Transfer Embodiments

FIG. 1 is a block diagram of an example information transfer system 100 in accordance with an embodiment described herein. Generally speaking, information transfer system 100 operates to transfer information to a device that requests the information. The information is based on characteristic(s) of a medical substance that are detected by sensor(s). As shown in FIG. 1, information transfer system 100 includes a requesting device 102 and a medical container 104. A medical container is a container that is configured to contain a medical substance. Examples of a medical container include but are not limited to a Petri dish, a test tube, a bag, a syringe, etc. Examples of a medical substance include but are not limited to blood, feces, urine, bile, bone marrow, muscle tissue, skin, brain tissue, cartilage, ligament, bone, medicine, nutritional supplement, etc.

Medical container 104 is associated with an information transfer module 112, sensor(s) 114, and actuator(s) 116. For instance, any one or more of the information transfer module 112, sensor(s) 114, and/or actuator(s) 116 may be contained in medical container 104, attached to medical container 104, incorporated into a structure of medical container 104, etc. Information transfer module 112, sensor(s) 114, and actuator(s) 116 are discussed in further detail below.

Medical container 104 is shown to include a base 122 and surrounding structure 124 for illustrative purposes and is not intended to be limiting. Base 122 is coupled to surrounding structure 124 to enable container 104 to contain a medical substance, which may be associated with a medical treatment program of a person, for example. For example, the medical substance may have been taken from the person's body for purposes of diagnosis of a medical problem that the person is experiencing. In another example, the medical substance may be intended for introduction to the person's body for purposes of treating a medical problem that the person is experiencing. It will be recognized that medical container 104 need not necessarily include surrounding structure 124. For example, medical container 104 may include base 122 without surrounding structure 124, for example, if surface tension of the medical substance in a liquid state is sufficient to inhibit (e.g., prevent) the medical substance from flowing off base 122 or if the medical substance is in a solid or semi-solid state.

Surrounding structure 124 is shown to include information transfer module 112, sensor(s) 114, and actuator(s) 116 for illustrative purposes and is not intended to be limiting. For example, base 122 may include any one or more of information transfer module 112, sensor(s) 114, and/or actuator(s) 116. In another example, any one or more of information transfer module 112, sensor(s) 114, and/or actuator(s) 116 may be included in neither base 122 nor surrounding structure 124. In accordance with this example, any one or more of information transfer module 112, sensor(s) 114, and/or actuator(s) 116 may be placed proximate to base 122 and/or surrounding structure 124, affixed to base 122 and/or surrounding structure 124, in a region defined by base 122 and surrounding structure 124, etc. In an aspect, one or more of information transfer module 112, sensor(s) 114, and/or actuator(s) 116 are suspended in the medical substance when the medical substance is in a fluid state in medical container 104.

In some example embodiments, medical container 104 includes a lid (not shown). For example, the lid may be coupled (e.g., clamped, screwed, adhered, etc.) to surrounding structure 124. In another example, the lid and surrounding structure 124 may be included in unitary structure. Examples of some embodiments that include a lid are discussed below with reference to FIGS. 2-5, though it will be recognized that the embodiments depicted in FIGS. 2-5 need not necessarily include a lid.

Sensor(s) 114 are configured to detect characteristic(s) pertaining to a medical substance that is included in medical container 104. Examples of a characteristic pertaining to a medical substance include but are not limited to temperature, chemical composition, etc. of the medical substance or an environment thereof; coloration, pH level, etc. of the medical substance; exposure of the medical substance to ambient air; and humidity, pressure, etc. in the environment of the medical substance.

Sensor(s) 114 may be configured in any of a variety of ways. In one example, one or more sensors may be included in a semiconductor package with information transfer module 112. For instance, each of the one or more sensors may be a microelectromechanical systems (MEMS) sensor or other type of sensor. In accordance with this example, the semiconductor package may include at least a first layer and a second layer. In further accordance with this example, the first layer may include the one or more sensors, and the second layer may include information transfer module 112.

In another example, information transfer system 100 may include a lab-on-a-chip, which includes at least one of the sensor(s) 114. For instance, the lab-on-a-chip may be configured to sequence deoxyribonucleic acid (DNA) that is included in the medical substance. Accordingly, the lab-on-a-chip may include a nucleotide sensor configured to detect nucleotides that are included in the DNA. It will be recognized that information transfer module 112 or a portion thereof may be included in the lab-on-a-chip.

Each of actuator(s) 116 is an electrical, electronic, or electromechanical device that is configured to perform operation(s) with regard to a medical substance that is included in medical container 104 or an environment in medical container 104. Examples of such operations include but are not limited to stirring and/or pumping the medical substance or a solution in which the medical substance is located (e.g., using a stirring and/or pumping motor), mixing the medical substance with another substance to achieve a modified medical substance (e.g., using a mixing motor), heating or cooling the medical substance or the environment thereof (e.g., using a heating element or a cooling element), unsealing medical container 104 (e.g., to expose the medical substance to an environment that is external to medical container 104), and shining light (e.g., using a suitable light source, such as a light emitting diode (LED)). Such operations may be performed to initiate a chemical reaction with regard to the medical substance, control a rate at which a drug is released into a fluid in the medical substance, etc. For instance, such operations may be included in a medical treatment program of a person to whom the medical substance pertains. Each of the operations may be performed continuously, periodically, or dynamically based on an instruction that specifies when the operation is to be performed and/or when the operation is not to be performed. For instance, such an instruction may be received from a control device (e.g., requesting device 102) that is external to medical container 104.

Information transfer module 112 is a processing system that is capable of communicating with requesting device 102. An example of a processing system is a system that includes at least one processor that is capable of manipulating data in accordance with a set of instructions. For instance, a processing system may be a computer, such as a microcontroller or a device that includes a microcontroller. In an example embodiment, information transfer module 112 is a near field communication (NFC) device. Accordingly, information transfer module 112 may operate in accordance with a NFC protocol.

Information transfer module 112 is configured to wirelessly transfer information 110, which is based on one or more of the characteristic(s) that are detected by sensor(s) 114, to requesting device 102 in response to a wireless request signal 108 from requesting device 102. Communication between requesting device 102 and information transfer module 112 may be performed in accordance with any suitable technique (e.g., protocol), such as a near field communication (NFC) technique.

Information transfer module 112 communicates with sensor(s) 114 via communication channel 118. Such communication may be initiated by receipt of the wireless request signal 108 by information transfer module 112. Information transfer module 112 may selectively read sensor(s) 114 based on the wireless request signal 108. For instance, information transfer module 112 may read a first sensor that is configured to detect a temperature of the medical substance but not a second sensor that is configured to detect a chemical composition of the medical substance based on the wireless request signal 108 indicating that the temperature of the medical substance is desired.

Information transfer module 112 communicates with actuator(s) 116 via communication channel 120. Such communication may be initiated by receipt of the wireless request signal 108 by information transfer module 112. Information transfer module 112 may selectively activate actuator(s) 116 based on the wireless request signal 108. For instance, information transfer module 112 may turn on one or more of the actuator(s) 116 and/or cause one or more of the actuator(s) 116 to perform designated operation(s) based on the wireless request signal 108. For example, information transfer module 112 may activate a first actuator that is configured to stir the medical substance but not a second actuator that is configured to shine light on the medical substance based on the wireless request signal 108 indicating that the medical substance is to be stirred before a sensor detects designated characteristic(s) that pertain to the medical substance.

In an example embodiment, information transfer module 112 communicates with sensor(s) 114 using a standardized protocol that is agnostic with regard to a type of each of the sensor(s) 114. In another example embodiment, information transfer module 112 communicates with actuator(s) 116 using a standardized protocol that is agnostic with regard to a type of each of the actuator(s) 116.

Requesting device 102 is a processing system that is capable of communicating with information transfer module 112. Requesting device 102 is configured to provide the wireless request signal 108 to information transfer module 112. For instance, requesting device 102 may continuously, periodically, or dynamically transmit the wireless request signal 108. In an example, the wireless request signal 108 may have a power, which decreases with distance from requesting device 102. Thus, the wireless request signal 108 may not have sufficient power to enable information transfer module 112 to transfer the information 110 if requesting device 102 is not within a designated proximity 106 to information transfer module 112. In accordance with this example, the wireless request signal 108 may activate information transfer module 112 in response to request device 102 coming within the designated proximity 106 to information transfer module 112. For instance, receipt of the wireless request signal 108 at information transfer module 112 may cause information transfer module 112 to turn on, to initiate retrieval of data regarding characteristic(s) that pertain to the medical substance, to generate the information 110 based on the data, and/or to transfer the information 110 to requesting device 102. It should be noted that the information 110 need not necessary be generated based on the data regarding the characteristic(s). For instance, the information 110 may be the same as the data (i.e., unchanged).

In an example embodiment, the designated proximity 106 is defined by a transmission range of requesting device 102. The transmission range of requesting device 102 is a distance from requesting device 102 beyond which the wireless request signal 108, which is transmitted by requesting device 102 to enable information transfer module 112 to transfer the information 110 does not have sufficient power to enable information transfer module 112 to transfer the information 110 to requesting device 102.

In another example embodiment, requesting device 102 is a near field reader. A near field reader is a device that is configured to communicate with a near field communication (NFC) device. Accordingly, requesting device 102 may operate in accordance with a NFC protocol.

Figure 2:
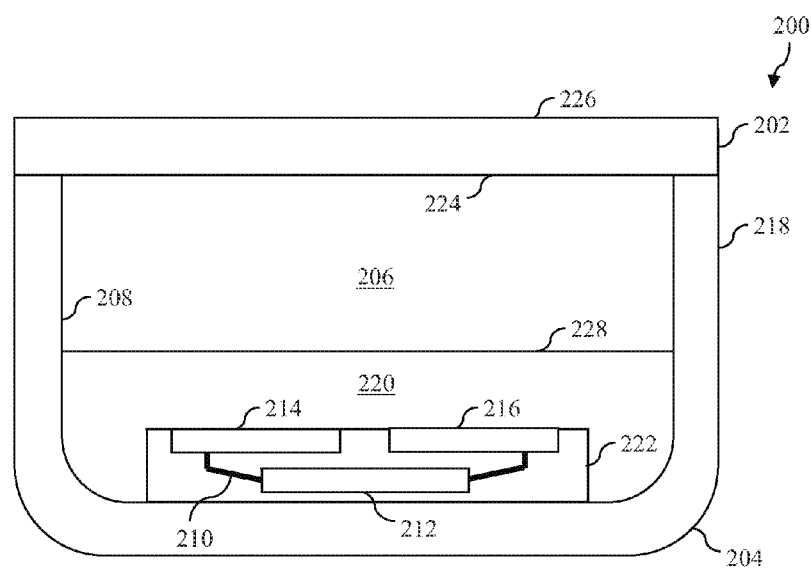
FIGS. 2-5 are block diagrams of example implementations of a medical container shown in FIG. 1 in accordance with embodiments described herein.

FIGS. 2-5 are block diagrams of medical containers 200, 300, 400, and 500, which are example implementations of medical container 104 shown in FIG. 1, in accordance with embodiments described herein. As shown in FIG. 2, medical container 200 includes a supporting structure 204 and a lid 202 for illustrative purposes. Supporting structure 204 includes a base and a surrounding structure, as described above with reference to FIG. 1, for illustrative purposes and is not intended to be limiting. Supporting structure 204 has an interior surface 208 and an exterior surface 218. The interior surface 208 defines an interior volume 206, which is configured to contain a medical substance 220. Medical substance 220 is shown in FIG. 2 to be a liquid for illustrative purposes and is not intended to be limiting. It will be recognized that the medical substance 220 may be in any suitable state (e.g., gas, liquid, solid, or any combination thereof). Lid 202 has an interior surface 224 and an exterior surface 226. For instance, the interior volume 206 may be further defined by interior surface 224.

An information transfer module 212, sensor(s) 214, and actuator(s) 216 are shown to be included in a common (e.g., single) package 222 for illustrative purposes. For instance, information transfer module 212, sensor(s) 214, and actuator(s) 216 may be provided on a common substrate in the package 222. Information transfer module 212 is electrically coupled to sensor(s) 214 and actuator(s) 216 by electrical connections 210. The package 222 is shown to be in contact with (e.g., positioned on) interior surface 208 for illustrative purposes. Accordingly, the package 222, information transfer module 212, sensor(s) 214, and actuator(s) 216 are said to be associated with interior surface 208. For instance, the package 222 may be implemented as a sticker that is placed on interior surface 208. This is merely one configuration of the package 222 and is not intended to be limiting. For example, the package 222 may be positioned on interior surface 224, such that the package 222, information transfer module 212, sensor(s) 214, and actuator(s) 216 are associated with interior surface 224. In another example, the package 222 may be suspended in medical substance 220. In yet another example, package 222 may float on an upper surface 228 of the medical substance 220. In accordance with this example, at least a portion of package 222 may extend out of the medical substance 220 (e.g., above the upper surface 228). In still another example, package 222 or a portion thereof may be incorporated (e.g., fabricated, embedded, etc.) into supporting structure 204 and/or lid 202.

It will be recognized that information transfer module 212, sensor(s) 214, and actuator(s) 216 need not necessarily be included in a common package. For instance, at least one of information transfer module 212, sensor(s) 214, and/or actuator(s) 216 may not be included in package 222. Examples of some embodiments in which a common package is not utilized are discussed below with reference to FIGS. 3-5 for illustrative purposes.

Examples of a sensor include but are not limited to a temperature sensor, a microfluidics sensor, a coloration sensor, a pH sensor, an ambient air sensor, a moisture sensor, and a pressure sensor. A temperature sensor is a sensor that is configured to detect a temperature associated with the medical substance 220. For instance, the temperature sensor may be configured to detect a temperature of the medical substance or a temperature in interior volume 206. A microfluidics sensor is a sensor that is configured to detect a chemical composition of the medical substance 220. For example, the microfluidics filter may have a series of hollow channels that have respective diameters. For each channel, chemicals having a molecular size smaller than a cross-section of the respective channel are capable of passing through the channel; chemicals having a molecular size greater than the cross-section of the respective channel are not capable of passing through the channel. The chemical composition of the medical substance 220 may be determined by observing the molecules of the chemicals in the channels.

A coloration sensor is a sensor that is configured to detect a color of the medical substance 220. For instance, the coloration sensor may detect a proportion of each of a plurality of primary colors that are associated with the medical substance 220. A pH sensor is a sensor that detects a pH level of the medical substance 220 or a solution in which the medical substance 220 is located. An ambient air sensor is a sensor that is configured to detect whether the medical substance 220 has been exposed to ambient air in interior volume 206. For instance, the ambient air sensor may be capable of detecting whether a seal of medical container 204 has been compromised (e.g., broken). A moisture sensor is a sensor that is configured to detect an amount of moisture in the medical substance 220 or an environment (e.g., atmosphere) in interior volume 206. For instance, the moisture sensor may detect a proportion of the medical substance 220 or the environment in interior volume 206 that is moisture. Accordingly, the moisture sensor may be used to detect humidity in interior volume 206. A pressure sensor is a sensor that is configured to detect a pressure in interior volume 206.

In an example embodiment in which sensor(s) 214 include a temperature sensor, at least one of the actuator(s) 216 is configured to adjust the temperature that is associated with the medical substance 220 in response to the temperature reaching a specified threshold. The threshold may be an upper threshold or a lower threshold. An upper threshold represents a temperature at or above which the at least one actuator is to attempt to cool the medical substance 220 and/or interior volume 206. Accordingly, the at least one actuator may be configured to reduce the temperature in response to the temperature reaching the upper threshold. A lower threshold represents a temperature at or below which the at least one actuator is to attempt to heat the medical substance 220 and/or interior volume 206. Accordingly, the at least one actuator may be configured to increase the temperature in response to the temperature reaching the lower threshold.

In another example embodiment, one or more of the sensor(s) 214 may be configured to change from a first state to a second state based on the respective sensor detecting a first instance of a specified characteristic pertaining to the medical substance 220. Accordingly, information transfer logic may obtain data from the sensor indicating that the sensor is in the second state. In accordance with this embodiment, information transfer logic 212 may be configured to reset the sensor from the second state to the first state in response to obtaining the data. For instance, resetting the sensor to the first state may enable the sensor to be re-used to detect a second instance of the specified characteristic at a time subsequent to the sensor detecting the first instance of the specified characteristic. In one example implementation, a short circuit indicates the first state, and an open circuit indicates the second state. In another example implementation, an open circuit indicates the first state, and a short circuit indicates the second state.

Figure 3:
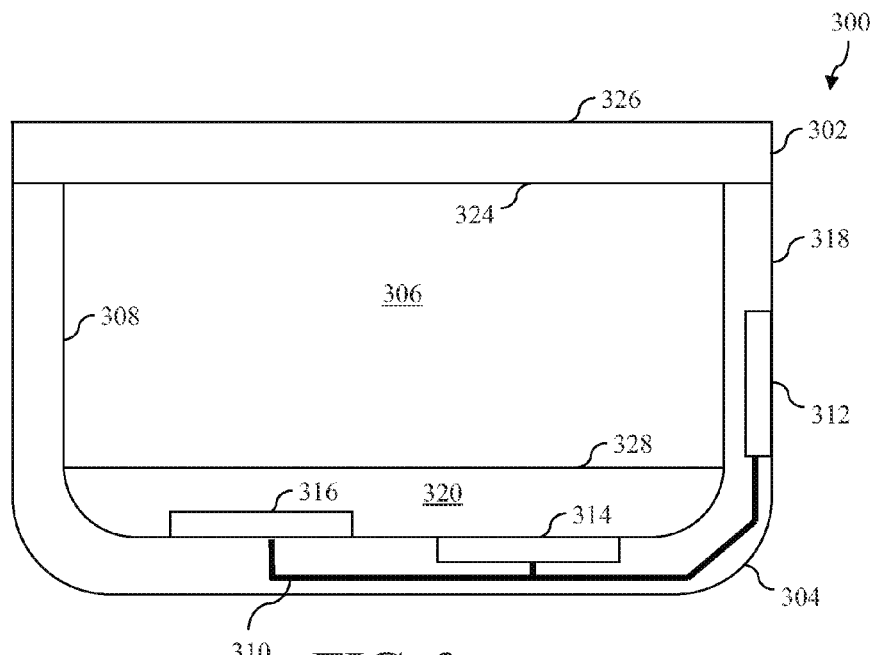

As shown in FIG. 3, medical container 300 includes a supporting structure 304 and a lid 302 for illustrative purposes. Supporting structure 304 has an interior surface 308 and an exterior surface 318. The interior surface 308 defines an interior volume 306, which is configured to contain a medical substance 320. Lid 302 has an interior surface 324 and an exterior surface 326. For instance, the interior volume 306 may be further defined by interior surface 324.

An information transfer module 312 is coupled to sensor(s) 314 and actuator(s) 316 via a communication link 310. Communications between information transfer module 312 and sensor(s) 314 may be isolated from communications between information transfer module 312 and actuator(s) 316, and vice versa. Information transfer module 312 and sensor(s) 314 are shown to be included in supporting structure 304. Information transfer module 312 has a surface that is coincident with exterior surface 318 for illustrative purposes, though it will be recognized that information transfer module 312 may extend out of supporting structure 304 (e.g., beyond exterior surface 318). Sensor(s) 314 have a surface that is coincident with interior surface 308 for illustrative purposes, though it will be recognized that any one or more of sensor(s) 314 may extend out of supporting structure 304 (e.g., beyond interior surface 308).

Actuator(s) 316 are shown to be external to supporting structure 304. Actuator(s) 316 are positioned in interior volume 306 and have a surface that is coincident with interior surface 308, though it will be recognized that any one or more of actuator(s) 316 may extend into supporting structure 304 (e.g., beyond interior surface 308).

As described above, sensor(s) 314 have a surface that is coincident with interior surface 208, and actuator(s) have a surface that is coincident with interior surface 208. Accordingly, sensor(s) 314 and actuator(s) 316 are said to be associated with interior surface 308. It will be recognized that having a surface that is coincident with interior surface 308 is merely one way in which a component (e.g., information transfer module 312, sensor(s) 314, and/or actuator(s) 316 may be associated with interior surface 308. For example, any one or more of information transfer module 312, sensor(s) 314, and/or actuator(s) 316 may be associated with interior surface 308 by being positioned in the interior volume 306 by a support element that extends into the interior volume 306 from interior surface 308. In another example, any one or more of information transfer module 312, sensor(s) 314, and/or actuator(s) 316 may be associated with interior surface 308 by being surrounded by interior surface 308 even if not coupled to interior surface 308. In yet another example, any one or more of sensor(s) 314 may be associated with interior surface 308 by being configured to detect characteristic(s) pertaining to the medical substance 320 through interior surface 308.

It will be recognized by persons skilled in the relevant art(s) that information transfer module 312 and/or any one or more of sensor(s) 314 may be included in or positioned on lid 302. For instance, information transfer module 312 and/or any one or more of sensor(s) 314 may have a surface that is coincident with interior surface 324 or exterior surface 326. It will be further recognized that information transfer module 312 and/or any one or more of sensor(s) 312 may be embedded within supporting structure 304 and/or lid 302. An item is embedded in a structure if the item is included in the structure and none of the surfaces of the item touch (e.g., intersect) a surface of the structure.

Figure 4:
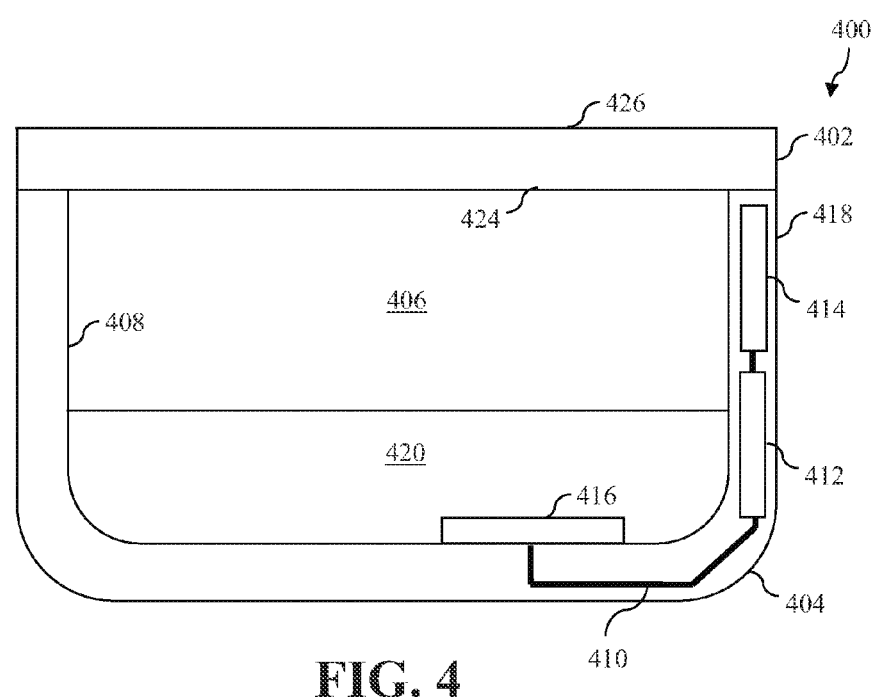

As shown in FIG. 4, medical container 400 includes a supporting structure 404 and a lid 402 for illustrative purposes. Supporting structure 404 has an interior surface 408 and an exterior surface 418. The interior surface 408 defines an interior volume 406, which is configured to contain a medical substance 420. Lid 402 has an interior surface 424 and an exterior surface 426.

An information transfer module 412 is coupled to sensor(s) 414 and actuator(s) 416 via a communication channel 410. Information transfer module 412 and sensor(s) 414 are shown to be embedded in supporting structure 404, such that no surfaces of information transfer module 412 and no surfaces of sensor(s) 414 touch interior surface 408 or exterior surface 418.

In some example embodiments, information transfer module 412 and/or sensor(s) 414 are embedded in lid 402, such that no surfaces of information transfer module 412 and no surfaces of sensor(s) 414 touch interior surface 424 or exterior surface 426.

Figure 5:
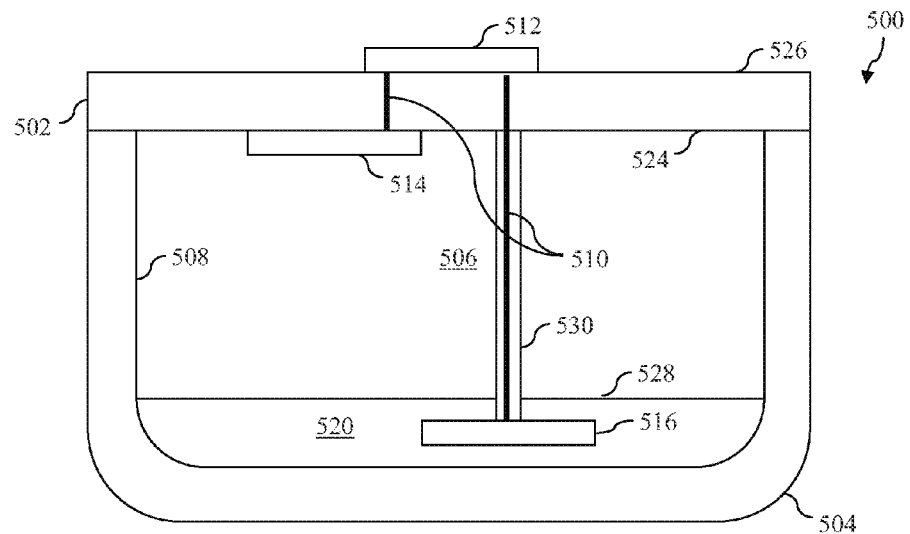

As shown in FIG. 5, medical container 500 includes a supporting structure 504 and a lid 502 for illustrative purposes. Supporting structure 504 has an interior surface 508, which defines an interior volume 506 that is configured to contain a medical substance 520. Lid 502 has an interior surface 524 and an exterior surface 526.

An information transfer module 512 is communicatively connected to sensor(s) 514 and actuator(s) 516 via tangible electrical conductors 510. Information transfer module 512 is located externally to lid 502 and attached to exterior surface 526 of lid 502. Sensor(s) 514 and actuator(s) 516 are located in interior volume 506. Sensor(s) 514 are attached to interior surface 524 of lid 502. Actuator(s) 516 are structurally connected to lid 502 via a structural member 530. At least one of the tangible electrical conductors 510 extends along (e.g., in, on, through, etc.) structural member 530 to communicatively connect information transfer module 512 and actuator(s) 516. Structural member 530 may be configured to place actuator(s) 530 within a specified proximity of the medical substance 520 (e.g., in the medical substance 520). For instance, actuator(s) 516 are shown in FIG. 5 to be positioned in the medical substance 520 (e.g., beneath an upper surface 528 of the medical substance 520), though the example embodiments are not limited in this respect.

In an example embodiment in which sensor(s) 514 include a pressure sensor, information transfer logic 512 may be configured to determine a state of the medical substance 520 and/or an amount of the medical substance 520 that is included in interior volume 506 based on a pressure that is detected by the pressure sensor. For instance, the state of the medical substance 520 may be a gaseous state, a liquid state, or a solid state. For example, the pressure sensor may detect a first pressure at a first time and a second pressure at a second time. Information transfer module 512 may be configured to determine a rate at which the medical substance 520 is being consumed based on a difference between the first pressure and the second pressure.

It will be recognized that the structures shown in FIGS. 2-5 need not necessarily include all structural elements depicted therein. For instance, actuators 216, 316, 416, and 516, lids 202, 302, 402, and 502, etc. need not be included with regard to FIGS. 2-5. Moreover, such structures may include structural elements in addition to or in lieu of the structural elements depicted therein.

Figure 6:
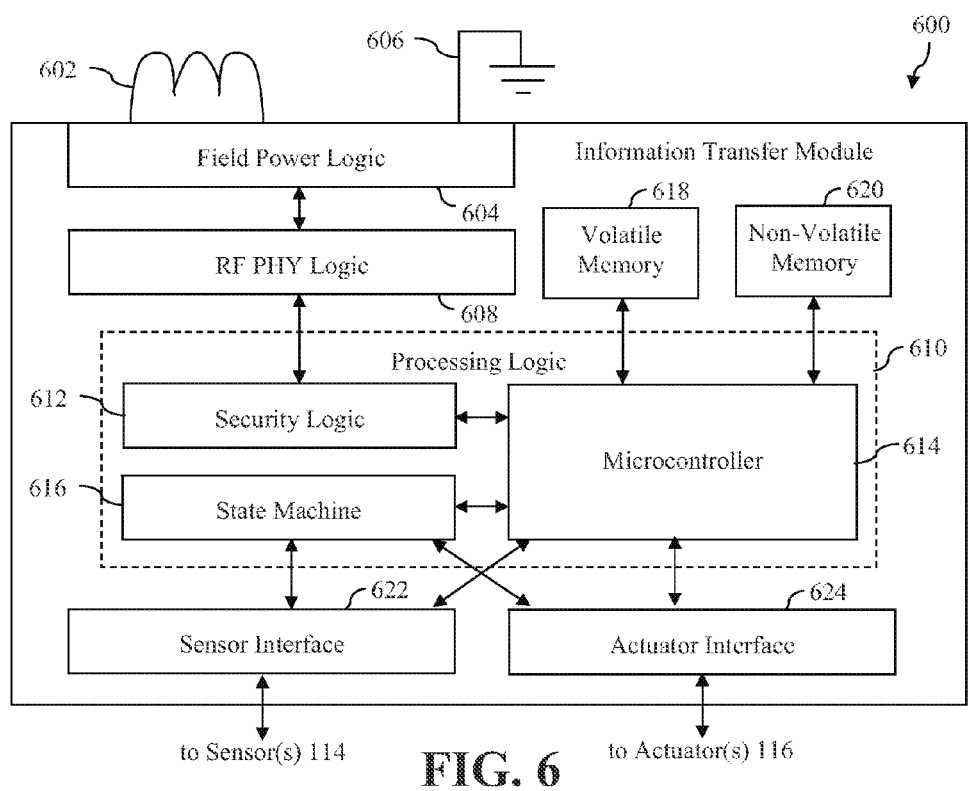
FIG. 6 is a block diagram of an example implementation of an information transfer module shown in FIGS. 1-5 in accordance with an embodiment described herein.

FIG. 6 is a block diagram an information transfer module 600, which is an example implementation of information transfer modules 112, 212, 312, 412, and 512 shown in FIGS. 1-5, in accordance with an embodiment described herein. As shown in FIG. 6, information transfer module 600 includes an antenna 602, field power logic 604, a ground terminal 606, radio frequency (RF) physical layer (PHY) logic 608, processing logic 610, volatile memory 618, non-volatile memory 620, a sensor interface 622, and an actuator interface 624.

Antenna 602 is configured to detect a wireless request signal (e.g., wireless request signal 108). For example, antenna 602 may detect the wireless request signal in response to a requesting device (e.g., requesting device 102) from which the wireless request signal is received coming within a designated proximity (e.g., designated proximity 106) of information transfer module 600. Antenna 602 is further configured to transmit a wireless information signal, which includes information (e.g., information 110) that is specified in the wireless request signal. For instance, antenna 602 may be tuned to detect and transmit signals in a frequency range that is defined by a designated protocol, such as a near field communication (NFC) protocol.

Field power logic 604 is configured to store energy from the wireless request signal that is received at antenna 602. For instance, field power logic 604 may include one or more charge pumps to store the energy. Field power logic 604 is configured to power information transfer module 600 using the stored energy. Accordingly, field power logic 604 acts as a power source that provides sufficient power for information transfer module 600 to transfer the information that is specified in the wireless request signal. For instance, field power logic 604 may power information transfer module 600 using the energy form the wireless request signal in absence of information transfer module 600 being powered by a battery.

Ground terminal 606 is an electrical ground that is connected to circuitry (e.g., charge pump(s)) in field power logic 604. Ground terminal 606 may be "on-chip" or "off-chip" with regard to information transfer module 600. If ground terminal 606 is "on-chip", ground terminal 606 is included on a semiconductor chip on which the information transfer module is fabricated. If ground terminal 606 is "off-chip", ground terminal 606 is not included on a semiconductor chip on which the information transfer module is fabricated.

RF PHY logic 608 is configured to detect a carrier signal that is included in the wireless request signal that is received at antenna 602. RF PHY logic 608 is further configured to modulate a carrier that is included in the wireless information signal that is transmitted by antenna 602.

Processing logic 610 is configured to perform processing operations with regarding to data and/or instructions that are received via antenna 602 (e.g., in a wireless request signal), via sensor interface 622 (e.g., from sensor(s) 114), via actuator interface 624 (e.g., from actuator(s) 116), etc. For instance, processing logic 610 may selectively modify data that is received via sensor interface 622 and/or actuator interface 624 based on a modification instruction that is received via antenna 602.

Processing logic 610 includes security logic 612, microcontroller 614, and state machine 616. Security logic 612 is configured to de-crypt data and instructions that are included in the wireless request signal for further processing by microcontroller 614. Security logic 612 is further configured to encrypt the information that is to be included in the wireless information signal for transmission via antenna 602.

In an example embodiment, security logic 612 is configured to determine whether a requester identifier that is included in the wireless request signal matches a reference identifier. In accordance with this embodiment, security logic 612 is further configured to enable the wireless transfer of the wireless information signal via antenna 602 in response to the requester identifier matching the reference identifier. In further accordance with this embodiment, security logic 612 is further configured to not enable (e.g., to inhibit, to prevent, etc.) the wireless transfer of the wireless information signal via antenna 602 in response to the requester identifier not matching the reference identifier. For example, the requester identifier may indicate whether the wireless request signal is from a requesting device and/or user thereof that is authenticated and/or authorized to receive the wireless information signal. In accordance with this example, the requester identifier matching the reference identifier may indicate that the requesting device and/or user from which the wireless request signal was received is authenticated and/or authorized to receive the wireless information signal.

It should be noted that a requesting device may use similar security technology. For instance, the requesting device may selectively request information from information transfer module 600 based on an authentication key that is associated with information transfer module 600 (e.g., in an attempt to avoid having the requesting device mistakenly authorize dispensing of a drug, in an attempt to avoid receiving information from information transfer module 600 when a sensor coupled to information transfer module 600 is disabled, etc.).

Microcontroller 614 includes a processor core, which includes one or more processors (e.g., hardware processors). Microcontroller may also include memory (e.g., Flash, ROM, RAM, etc.), and/or input/output peripherals. Microcontroller 614 provides instructions to state machine 616 to control operations that state machine 616 performs with regard to sensor(s) via sensor interface 622 and/or actuator(s) via actuator interface 624. For example, microcontroller 614 may program state machine 616 to read a designated subset (e.g., all) of the sensor(s) and/or in a designated order based on the wireless request signal that is received at antenna 602. In accordance with this example, microcontroller 614 may program state machine 616 to wait a specified time after providing a stimulus to a sensor before reading the sensor. For instance, microcontroller 614 may program state machine 616 to provide a first stimulus to a first sensor at a first time, wait a first amount of time, and read the first sensor; provide a second stimulus to a second sensor, wait a second amount of time, and read the second sensor; and so on.

In another example, microcontroller 614 may program state machine 616 to cause a designated subset (e.g., all) of the actuator(s) to perform their respective functions and/or in a designated order based on the wireless request signal. In accordance with this example, microcontroller 614 may program state machine 616 to wait a specified time after causing an actuator to perform its function before causing another actuator to perform its function. For instance, microcontroller 614 may program state machine 616 to cause a first actuator to initiate performance of its function, wait a first amount of time, cause a second actuator to initiate performance of its function, wait a second amount of time, and so on.

It will be recognized that microcontroller 614 may provide instructions directly to sensor(s) via sensor interface 622 and/or directly to actuator(s) via actuator interface 624 in addition to or in lieu of providing the aforementioned instructions to state machine 616.

State machine 616 is configured to read data from sensor(s) and store such data is memory (e.g., volatile memory 618 and/or non-volatile memory 620). State machine 616 may be further configured to cause actuator(s) to perform operations for which the actuator(s) are configured. It will be recognized that state machine 616 may receive data from the actuator(s) regarding functionality thereof (e.g., an indication whether a specified operation is performed). State machine 616 may store such data in memory.

Sensor interface 622 allows microcontroller 614 and state machine 616 to communicate with sensor(s). Actuator interface 624 allows microcontroller 614 and state machine 616 to communicate with actuator(s). Sensor interface 622 and/or actuator interface 624 may include any of a variety of components, such as an analog to digital converter.

In some example embodiments, sensor(s) are passive, such that information transfer module 600 need not necessarily provide power to the sensor(s). In other example embodiments, sensor(s) are active. In accordance with these embodiments, information transfer module 600 provides some of the energy that is stored by field power logic 604 to the sensor(s) via sensor interface 622 to power the sensor(s). For instance, microcontroller 614 may provide such energy via sensor interface 622. The energy provided by information transfer module 600 may enable the sensor(s) to detect specified characteristic(s).

In an example embodiment, volatile memory 618 and/or non-volatile memory 620 store a logic identifier that identifies information transfer module 600. In accordance with this embodiment, processing logic 610 retrieves the logic identifier from volatile memory 618 and/or non-volatile memory 620 and includes the logic identifier in the wireless information signal or a signal that is associated therewith for transmission via antenna 602. For instance, the logic identifier may indicate that the information is from information transfer module 600.

In another example embodiment, volatile memory 618 and/or non-volatile memory 620 stores designated data, which includes patient data (name, age, blood type, medical history, etc.) regarding a patient who is associated with a medical substance, doctor data (e.g., name, specialty, hospital affiliation(s), etc.) regarding a doctor who is treating the patient, and/or treatment data regarding a treatment that the patient is to receive with regarding to the medical substance. For example, the treatment data may indicate a prescription. In another example, if the medical substance is a drug, the treatment data may specify the name of the drug. In accordance with this embodiment, processing logic 610 retrieves at least some of the designated data from volatile memory 618 and/or non-volatile memory 620 and includes such data in the wireless information signal or a signal that is associated therewith for transmission via antenna 602. For instance, the data may indicate that the information is associated with the patient, the doctor, and/or the treatment.

In accordance with this embodiment, the designated data may be utilized by a requesting device to remotely authorize taking of medication. For example, the designated data may specify the medication. In accordance with this example, information transfer module 600 may receive a dispensing instruction from the requesting device in response to information transfer module 600 providing the designated data to the requesting device. The dispensing instruction may specify a dose of the medication to be dispensed. Processing logic 610 may control an actuator via actuator interface 624 to cause the actuator to dispense the specified dose of the mediation. Accordingly, information transfer module 600 may serve as an automatic pharmacy to dispense specified doses of a medication at specified times, wherein the specified doses and specified times are indicated by wireless request signals that are received by information transfer module 600 from requesting device(s).

In yet another example embodiment, processing logic 610 performs a test (e.g., a glucose test) with regard to a medical substance using sensor(s) (e.g., one or more of sensor(s) 114) to provide a test result. Processing logic 610 (e.g., microcontroller 614) may cause the information that is included in the wireless information signal to include the test result.

In still another example embodiment, information transfer module 600 is a near field communication (NFC) device. In accordance with this embodiment, antenna 602 is a NFC coil. An NFC coil is a coil that is configured to transmit and/or receive signals in accordance with an NFC protocol.

It will be recognized that information transfer module 600 may not include one or more of antenna 602, field power logic 604, ground terminal 606, RF PHY logic 608, processing logic 610, security logic 612, microcontroller 614, state machine 616, volatile memory 618, non-volatile memory 620, sensor interface 622, and/or actuator interface 624. Furthermore, information transfer module 600 may include elements in addition to or in lieu of antenna 602, field power logic 604, ground terminal 606, RF PHY logic 608, processing logic 610, security logic 612, microcontroller 614, state machine 616, volatile memory 618, non-volatile memory 620, sensor interface 622, and/or actuator interface 624. For instance, in an example embodiment, information transfer module 600 includes at least one battery. In accordance with this embodiment, the at least one battery may power information transfer module 600 using energy that is stored in the at least one battery. Accordingly, energy from the wireless request signal need not necessarily be used to power information transfer module 600.

Figure 7:
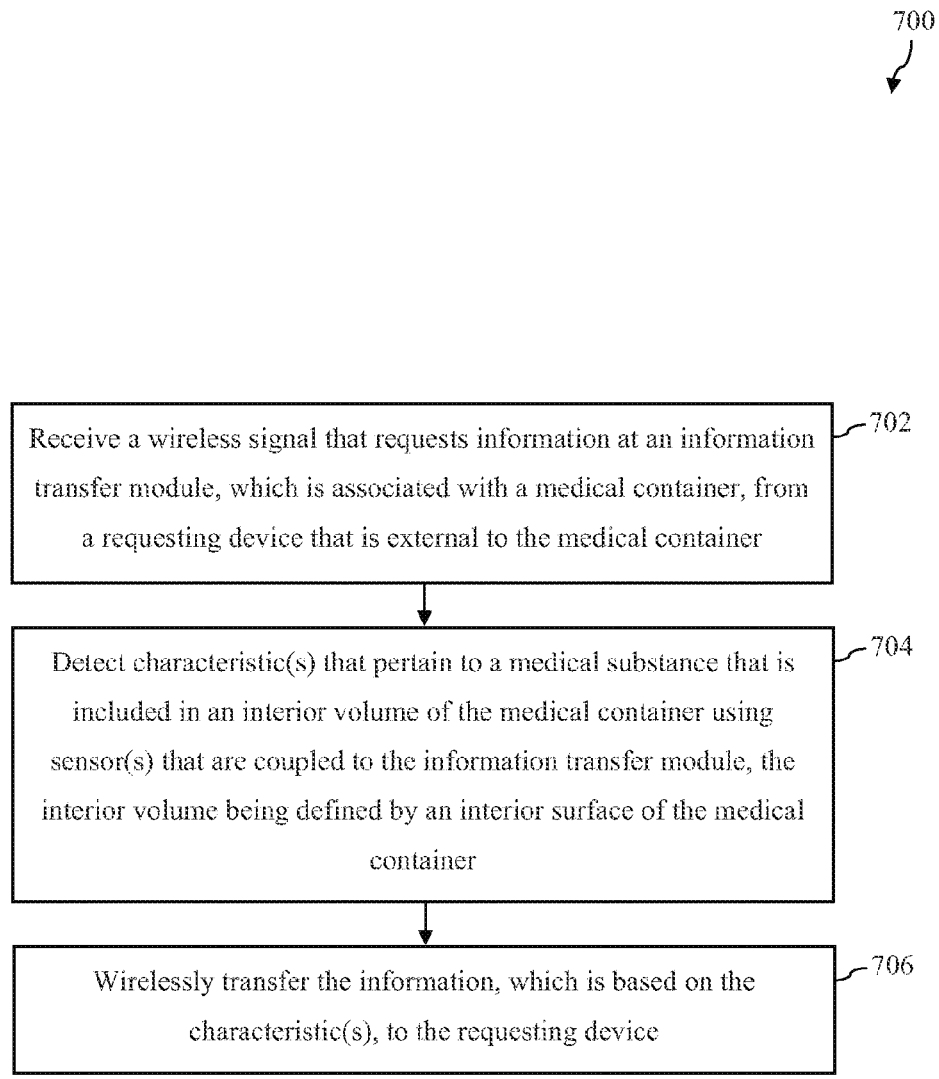
FIG. 7 depicts a flowchart of an example method for transferring information in accordance with an embodiment described herein.

FIG. 7 depicts a flowchart 700 of an example method for transferring information in accordance with an embodiment described herein. Flowchart 700 may be performed by information transfer system 100 shown in FIG. 1, for example. Accordingly, flowchart 700 is described with respect to information transfer system 100. Further structural and operational embodiments will be apparent to persons skilled in the relevant art(s) based on the discussion regarding flowchart 700.

At step 702, a wireless signal that requests information is received at an information transfer module, which is associated with a medical container, from a requesting device that is external to the medical container. For instance, the wireless signal may be received in response to the requesting device coming within a designated proximity to the information transfer module. In an example implementation, information transfer module 112 receives wireless request signal 108 from requesting device 102, which is external to medical container 104. The wireless request signal 108 requests information 110.

At step 704, characteristic(s) that pertain to a medical substance that is included in an interior volume of the medical container are detected using sensor(s) that are coupled to the information transfer module. The interior volume is defined by an interior surface of the medical container. In an example implementation, sensor(s) 114, which are coupled to information transfer module 112, detect characteristic(s) that pertain to a medical substance that is included in an interior volume of medical container 104.

At step 706, the information, which is based on the characteristic(s), is wirelessly transferred to the requesting device. For instance, the information transfer module may generate the information based on the characteristic(s). In an example implementation, information transfer module 112 wirelessly transfers the information 110 to requesting device 102.

In some example embodiments, one or more steps 702, 704, and/or 706 of flowchart 700 may not be performed. Moreover, steps in addition to or in lieu of steps 702, 704, and/or 706 may be performed.

In some example embodiments, a medical container that is associated with an information transfer module is discarded after the information transfer module is used to transfer information to a requesting device. In other example embodiments, the medical container is capable of being re-used after the information transfer module transfers such information. For instance, sensor(s) and/or actuator(s) associated with the medical container may be reset (e.g., automatically reset) to respective specified (e.g., predetermined) state(s) after such information is transferred by the information transfer module. In some example embodiments, an information transfer module is capable of being removed from a medical container with which the information transfer module is associated, cleaned (e.g., hermetically sealed), and re-used with the same or another medical container.

It will be recognized that requesting device 102, information transfer module 112, sensor(s) 114, and actuator(s) 116 depicted in FIG. 1; information transfer module 212, sensor(s) 214, and actuator(s) 216 depicted in FIG. 2; information transfer module 312, sensor(s) 314, and actuator(s) 316 depicted in FIG. 3; information transfer module 412, sensor(s) 414, and actuator(s) 416 depicted in FIG. 4; information transfer module 512, sensor(s) 514, and actuator(s) 516 depicted in FIG. 5; and field power logic 604, RF PHY logic 608, processing logic 610, security logic 612, microcontroller 614, and state machine 616 depicted in FIG. 6 may be implemented in hardware, software, firmware, or any combination thereof.

For example, requesting device 102, information transfer module 112, sensor(s) 114, actuator(s) 116, information transfer module 212, sensor(s) 214, actuator(s) 216, information transfer module 312, sensor(s) 314, actuator(s) 316, information transfer module 412, sensor(s) 414, actuator(s) 416, information transfer module 512, sensor(s) 514, actuator(s) 516, field power logic 604, RF PHY logic 608, processing logic 610, security logic 612, microcontroller 614, and/or state machine 616 may be implemented as computer program code configured to be executed in one or more processors.

In another example, requesting device 102, information transfer module 112, sensor(s) 114, actuator(s) 116, information transfer module 212, sensor(s) 214, actuator(s) 216, information transfer module 312, sensor(s) 314, actuator(s) 316, information transfer module 412, sensor(s) 414, actuator(s) 416, information transfer module 512, sensor(s) 514, actuator(s) 516, field power logic 604, RF PHY logic 608, processing logic 610, security logic 612, microcontroller 614, and/or state machine 616 may be implemented as hardware logic/electrical circuitry.

Figure 8:
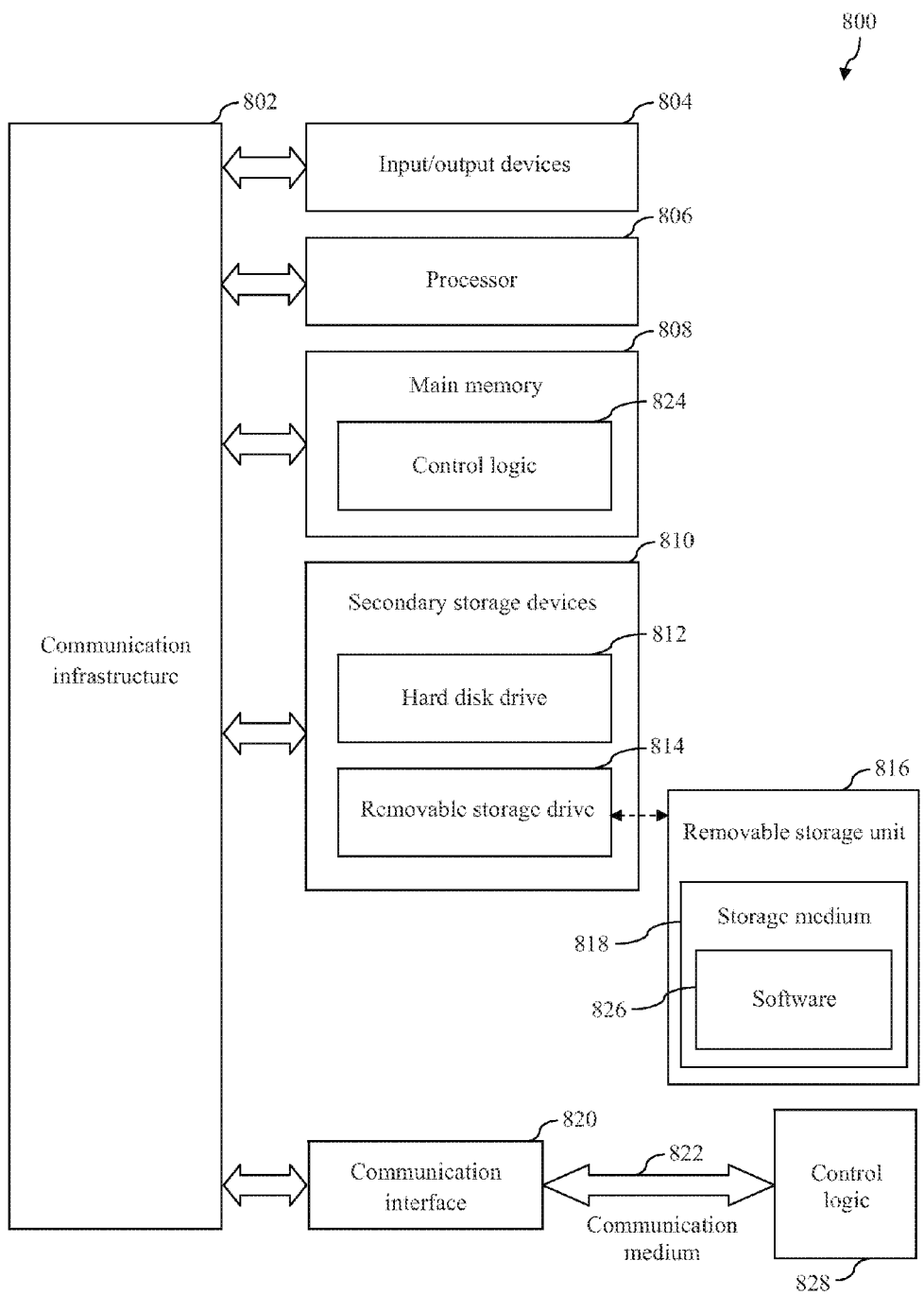
FIG. 8 is a block diagram of a computer in which embodiments may be implemented.

For instance, FIG. 8 is a block diagram of a computer 800 in which embodiments may be implemented. As shown in FIG. 8, computer 800 includes one or more processors (e.g., central processing units (CPUs)), such as processor 806. Processor 806 may include requesting device 102, information transfer module 112, sensor(s) 114, and/or actuator(s) 116 of FIG. 1; information transfer module 212, sensor(s) 214, and/or actuator(s) 216 of FIG. 2; information transfer module 312, sensor(s) 314, and/or actuator(s) 316 of FIG. 3; information transfer module 412, sensor(s) 414, and/or actuator(s) 416 of FIG. 4; information transfer module 512, sensor(s) 514, and/or actuator(s) 516 of FIG. 5; and/or field power logic 604, RF PHY logic 608, processing logic 610, security logic 612, microcontroller 614, and/or state machine 616 of FIG. 6; or any portion or combination thereof, for example, though the scope of the example embodiments is not limited in this respect. Processor 806 is connected to a communication infrastructure 802, such as a communication bus. In some example embodiments, processor 806 can simultaneously operate multiple computing threads.

Computer 800 also includes a primary or main memory 808, such as a random access memory (RAM). Main memory has stored therein control logic 824 (computer software), and data.

Computer 800 also includes one or more secondary storage devices 810. Secondary storage devices 810 include, for example, a hard disk drive 812 and/or a removable storage device or drive 814, as well as other types of storage devices, such as memory cards and memory sticks. For instance, computer 800 may include an industry standard interface, such as a universal serial bus (USB) interface for interfacing with devices such as a memory stick. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 818 (e.g., a non-transitory medium) having stored therein computer software 826 (control logic) and/or data. Removable storage unit 816 represents a floppy disk, magnetic tape, compact disc (CD), digital versatile disc (DVD), Blue-ray disc, optical storage disk, memory stick, memory card, or any other computer data storage device. Removable storage drive 814 reads from and/or writes to removable storage unit 816 in a well known manner.

Computer 800 also includes input/output devices 804, which may include any one or more of sensor(s) 114, 214, 314, 414, and/or 514 and/or any one or more of actuator(s) 116, 216, 316, 416, and/or 516, for example.

Computer 800 further includes a communication or network interface 820. Communication interface 820 enables computer 800 to communicate with remote devices. For example, communication interface 820 allows computer 800 to communicate over communication networks or mediums 822 (representing a form of a computer useable or readable medium), such as local area networks (LANs), wide area networks (WANs), the Internet, cellular networks, etc. Network interface 820 may interface with remote sites or networks via wired or wireless connections.

Control logic 828 may be transmitted to and from computer 800 via the communication medium 822.

Any apparatus or manufacture comprising a computer useable or readable medium having control logic (software) stored therein is referred to herein as a computer program product or program storage device. This includes, but is not limited to, computer 800, main memory 808, secondary storage devices 810, and removable storage unit 816. Such computer program products, having control logic stored therein that, when executed by one or more data processing devices, cause such data processing devices to operate as described herein, represent embodiments of the disclosed technologies.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, micro-electromechanical systems-based (MEMS-based) storage devices, nanotechnology-based storage devices, as well as other media such as flash memory cards, digital video discs, RAM devices, ROM devices, and the like.

Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

Such computer-readable storage media may store program modules that include computer program logic for requesting device 102, information transfer module 112, sensor(s) 114, actuator(s) 116, information transfer module 212, sensor(s) 214, actuator(s) 216, information transfer module 312, sensor(s) 314, actuator(s) 316, information transfer module 412, sensor(s) 414, actuator(s) 416, information transfer module 512, sensor(s) 514, actuator(s) 516, field power logic 604, RF PHY logic 608, processing logic 610, security logic 612, microcontroller 614, and/or state machine 616, and/or flowchart 700 (including any one or more steps of flowchart 700); and/or further embodiments described herein. Some example embodiments are directed to computer program products comprising such logic (e.g., in the form of program code or software) stored on any computer useable medium. Such program code, when executed in one or more processors, causes a device to operate as described herein.

The disclosed technologies can be put into practice using software, firmware, and/or hardware implementations other than those described herein. Any software, firmware, and hardware implementations suitable for performing the functions described herein can be used.

III. Conclusion

While various embodiments have been described above, it should be understood that they have been presented by way of example only, and not limitation. It will be understood by those skilled in the relevant art(s) that various changes in form and details may be made to the embodiments described herein without departing from the spirit and scope of the disclosed technologies as defined in the appended claims. Accordingly, the breadth and scope of the disclosed technologies should not be limited by any of the above-described exemplary embodiments, but should be defined only in accordance with the following claims and their equivalents.

What is claimed is:

1. A system comprising:
    a supporting structure of a medical container, the supporting structure having an interior surface that defines an interior volume configured to contain a medical substance that is a liquid or a gas;
    at least one sensor located in the interior volume that is configured to detect one or more characteristics pertaining to the medical substance, the at least one sensor comprising a first sensor configured to change from a first state to a second state based on the first sensor detecting a first instance of a first characteristic of the one or more characteristics; and
    an information transfer module located externally to the medical container and is communicatively connected to the at least one sensor via one or more electrical conductors, the information transfer module comprising processing logic configured to reset the first sensor from the second state to the first state to enable the first sensor to be re-used to detect a second instance of the first characteristic at a time subsequent to the first sensor detecting the first instance of the first characteristic.

2. The system of claim 1, wherein the at least one sensor comprises:
    a microfluidics sensor configured to detect a chemical composition of the medical substance.

3. The system of claim 1, wherein the at least one sensor comprises:
    a first sensor configured to detect whether the medical substance is exposed to ambient air within the interior volume.

4. The system of claim 1, wherein the at least one sensor comprises:
    at least one microelectromechanical systems (MEMS) sensor.

5. The system of claim 1, wherein the system further comprises:
    an actuator positioned in the volume and configured to perform at least one of a stir operation or a pump operation with regard to the medical substance.

6. A system comprising:
    a supporting structure of a medical container, the supporting structure having an interior surface that defines an interior volume configured to contain a medical substance that is a liquid or a gas;
    at least one sensor that is configured to detect one or more characteristics pertaining to the medical substance, the at least one sensor comprising a first sensor configured to change from a first state to a second state based on the first sensor detecting a first instance of a first characteristic of the one or more characteristics; and
    an information transfer module that is coupled to the at least one sensor and that is configured to wirelessly transfer information, which is based on at least one of the one or more characteristics, to a requesting device that is external to the medical container in response to receiving a wireless request signal from the requesting device coming within a designated proximity of the information transfer module, the information transfer module being embedded in the supporting structure, the information transfer module comprising processing logic configured to reset the first sensor from the second state to the first state to enable the first sensor to be re-used to detect a second instance of the first characteristic at a time subsequent to the first sensor detecting the first instance of the first characteristic.

7. The system of claim 6, comprising a lab-on-a-chip that is configured to sequence deoxyribonucleic acid (DNA) that is included in the medical substance;
    wherein the lab-on-a-chip includes a nucleotide sensor configured to detect nucleotides that are included in the DNA; and
    wherein the at least one sensor includes the nucleotide sensor.

8. The system of claim 6, wherein the at least one sensor comprises:
    a temperature sensor configured to detect a temperature associated with the medical substance; and wherein the system further comprises:
an actuator configured to adjust the temperature in response to the temperature reaching a specified threshold.

9. The system of claim 6, wherein the at least one sensor is located in the interior volume.

10. The system of claim 6, wherein the information transfer module comprises:
field power logic configured to store energy from the wireless request signal; and
wherein the field power logic is further configured to power the information transfer module using the energy from the wireless request signal in absence of the information transfer module being powered by a battery.

11. The system of claim 6, wherein the information transfer module comprises:
a near field communication (NFC) coil that receives the wireless request signal; and
processing logic that obtains data regarding the at least one of the one or more characteristics from the at least one sensor in response to receipt of the wireless request signal;
wherein the information transfer module wirelessly transfers the information to the requesting device via the near field communication coil.

12. The system of claim 6, wherein the information transfer module comprises:
security logic configured to determine whether a requester identifier that is included in the wireless request signal matches a reference identifier;
wherein the security logic is further configured to enable the wireless transfer of the information to the requesting device in response to the requester identifier matching the reference identifier; and
wherein the security logic is further configured to not enable the wireless transfer of the information to the requesting device in response to the requester identifier not matching the reference identifier.

13. The system of claim 6, wherein the information transfer module comprises:
memory that stores a logic identifier that identifies the information transfer module; and
wherein the information transfer module wirelessly transfers the logic identifier along with the information to the requesting device to indicate that the information is from the information transfer module.

14. The system of claim 6, wherein the information transfer module comprises:
memory that stores designated data, the designated data including at least one of patient data regarding a patient who is associated with the medical substance, doctor data regarding a doctor who is associated with the patient, or treatment data regarding a treatment that the patient is to receive with regarding to the medical substance; and
wherein the information transfer module wirelessly transfers the designated data along with the information to the requesting device.

15. The system of claim 6, wherein the designated proximity is defined by a transmission range of the requesting device, the transmission range being a distance from the requesting device beyond which the wireless request signal, which is transmitted the requesting device to enable the information transfer module to transfer the information, does not have sufficient power to enable the information transfer module to wirelessly transfer the information to the requesting device.

16. A system comprising:
a supporting structure of a medical container, the supporting structure having an interior surface that defines an interior volume configured to contain a medical substance that is a liquid or a gas;
at least one sensor that is configured to detect one or more characteristics pertaining to the medical substance, the at least one sensor comprising a first sensor configured to change from a first state to a second state based on the first sensor detecting a first instance of a first characteristic of the one or more characteristics; and
a near field communication device that is coupled to the at least one sensor and that is configured to wirelessly transfer information, which is based on at least one of the one or more characteristics, to a near field reader in accordance with a near field communication protocol in response to receipt of a wireless request signal from the near field reader, the near field communication device being at least partially suspended in the medical substance, the near field communication device comprising processing logic configured to reset the first sensor from the second state to the first state to enable the first sensor to be re-used to detect a second instance of the first characteristic at a time subsequent to the first sensor detecting the first instance of the first characteristic.

17. The system of claim 16, wherein the information transfer module comprises:
memory that stores designated data, the designated data including at least one of patient data regarding a patient who is associated with the medical substance, doctor data regarding a doctor who is associated with the patient, or treatment data regarding a treatment that the patient is to receive with regarding to the medical substance; and
wherein the information transfer module wirelessly transfers the designated data along with the information to the requesting device.

18. The system of claim 16, wherein the at least one sensor and the near field communication device are included in a common package.

* * * * *